United States Patent
Nitta et al.

(10) Patent No.: US 9,416,313 B2
(45) Date of Patent: Aug. 16, 2016

(54) YELLOW FLUORESCENT SUBSTANCE, LIGHT-EMITTING DEVICE, ILLUMINATION DEVICE, AND VEHICLE

(71) Applicant: Panasonic Corporation, Osaka (JP)

(72) Inventors: Mitsuru Nitta, Osaka (JP); Seigo Shiraishi, Osaka (JP); Osamu Inoue, Osaka (JP); Kojiro Okuyama, Nara (JP); Yoshihisa Nagasaki, Osaka (JP); Takashi Ohbayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 14/460,372

(22) Filed: Aug. 15, 2014

(65) Prior Publication Data
US 2015/0055358 A1    Feb. 26, 2015

(30) Foreign Application Priority Data

Aug. 22, 2013   (JP) .................................. 2013-172601

(51) Int. Cl.
   *F21V 11/00*   (2015.01)
   *C09K 11/77*   (2006.01)
   *F21S 8/10*    (2006.01)

(52) U.S. Cl.
   CPC ......... *C09K 11/7792* (2013.01); *C09K 11/7734* (2013.01); *F21S 48/1145* (2013.01); *F21S 48/1225* (2013.01); *F21S 48/1233* (2013.01); *F21S 48/1323* (2013.01)

(58) Field of Classification Search
   CPC ........... C09K 11/7734; C09K 11/7792; C09K 11/774; C09K 11/7737; C09K 11/7766; C09K 11/7759; F21S 48/1145; F21S 48/1225; F21S 48/1233; F21S 48/1323
   USPC .............................................. 362/510, 231, 84
   See application file for complete search history.

(56) References Cited

U.S. PATENT DOCUMENTS

| | | | |
|---|---|---|---|
| 7,951,308 B2 | 5/2011 | Tamaki et al. | |
| 9,074,136 B2 * | 7/2015 | Zhou .................. | C09K 11/7774 |
| 2005/0253500 A1 * | 11/2005 | Gotoh ................ | C09K 11/0838 313/486 |
| 2006/0011936 A1 * | 1/2006 | Hiramatsu ......... | C09K 11/7734 257/100 |
| 2006/0081814 A1 * | 4/2006 | Shida .................. | C09K 11/7734 252/301.4 F |
| 2006/0231796 A1 * | 10/2006 | Shida .................. | C09K 11/7734 252/301.4 F |
| 2009/0050846 A1 | 2/2009 | Becker et al. | |
| 2010/0213822 A1 | 8/2010 | Shimooka et al. | |
| 2011/0135928 A1 | 6/2011 | Ravilisetty et al. | |

FOREIGN PATENT DOCUMENTS

| | | |
|---|---|---|
| JP | 2004-210921 | 7/2004 |
| JP | 2006-097034 | 4/2006 |
| JP | 2009-263201 | 11/2009 |
| JP | 2011-515536 | 5/2011 |
| JP | 5150515 | 2/2013 |

* cited by examiner

*Primary Examiner* — Ali Alavi
(74) *Attorney, Agent, or Firm* — McDermott Will & Emery LLP

(57) ABSTRACT

The present invention provides an oxynitride silicate fluorescent substance capable of output a light having a high luminance even when irradiated by an exciting light having a high energy density. The present invention is a yellow fluorescent substance represented by a chemical formula $(Ba_{1-x-y-z},Sr_x)_a Si_b O_c N_d:Eu^{2+}_y,Y^{3+}_z$ ($0.9 \le a \le 1.1$, $1.9 \le b \le 2.1$, $1.9 \le c \le 2.1$, $1.9 \le d \le 2.1$, $0 \le x \le 1$, $0 < y < 0.01$, and $0 \le z < 0.01$).

14 Claims, 5 Drawing Sheets

YELLOW FLUORESCENT SUBSTANCE, LIGHT-EMITTING DEVICE, ILLUMINATION DEVICE, AND VEHICLE

BACKGROUND

1. Field of the Invention

The present invention relates to a yellow fluorescent substance and a light-emitting device using the same. The present invention also relates to an illumination device comprising the light-emitting device and a vehicle comprising the illumination device.

2. Description of the Related Art

Recently, a white light-emitting device in which a semiconductor light-emitting element is used in combination with a fluorescent substance has been developed. The semiconductor light-emitting element emits light from a near-ultraviolet range to a blue range. An example of the semiconductor light-emitting element is a light-emitting diode. The semiconductor light-emitting element may be used as an exciting light source for the fluorescent substance. Such a white light-emitting device has a long life and uses much less power.

In one example of such a white light-emitting device, a blue light-emitting diode is used in combination with a yellow fluorescent substance. In the example, a part of the light emitted from the blue light-emitting diode is converted into yellow light using the yellow fluorescent substance. The remaining blue light emitted from the blue light-emitting diode is mixed with the yellow light which has been provided through the yellow fluorescent substance to give white light. In another example of the white light-emitting device, a light-emitting diode selected from the group consisting of a near-ultraviolet light-emitting diode, a violet light-emitting diode, and a blue-violet light-emitting diode is used in combination with the blue fluorescent substance and the yellow fluorescent substance. In such a white light-emitting device, at least a part of the light emitted from the light-emitting diodes is converted by the blue fluorescent substance and the yellow fluorescent substance. The light which has been thus converted is mixed to give white light.

White light-emitting devices are used for light sources of various illumination devices. From a viewpoint of an improvement of design, a vehicle illumination device in which a light source thereof has been downsized is expected to be provided.

United States Pre-Grant Patent Application Publication No. 2009/0050846 discloses a phosphor from the class of the oxynitride silicates represented by a chemical formula $M_{1-k}Si_2O_2N_2:Eu^{2+}{}_k$ (M=Ca, Sr, or Ba). This phosphor from the class of the oxynitride silicates is one of typical yellow fluorescent substances excited by light having a wavelength from a near-ultraviolet range to a blue range.

SUMMARY

The present invention provides a yellow fluorescent substance represented by a chemical formula $(Ba_{1-x-y-z},Sr_x)_aSi_bO_cN_d:Eu^{2+}{}_y,Y^{3+}{}_z$, wherein all of the following seven mathematical formulae (I)-(VII) are satisfied:

$$0.9 \leq a \leq 1.1 \quad \text{(I)}$$

$$1.9 \leq b \leq 2.1 \quad \text{(II)}$$

$$1.9 \leq c \leq 2.1 \quad \text{(III)}$$

$$1.9 \leq d \leq 2.1 \quad \text{(IV)}$$

$$0 \leq x \leq 1 \quad \text{(V)}$$

$$0 < y < 0.01 \quad \text{(VI)}$$

$$0 \leq z < 0.01 \quad \text{(VII)}.$$

The present invention provides an oxynitride silicate fluorescent substance capable of outputting light having a high luminance even when irradiated with exciting light having a high energy density.

DETAILED DESCRIPTION OF THE EMBODIMENTS

Figure 1:
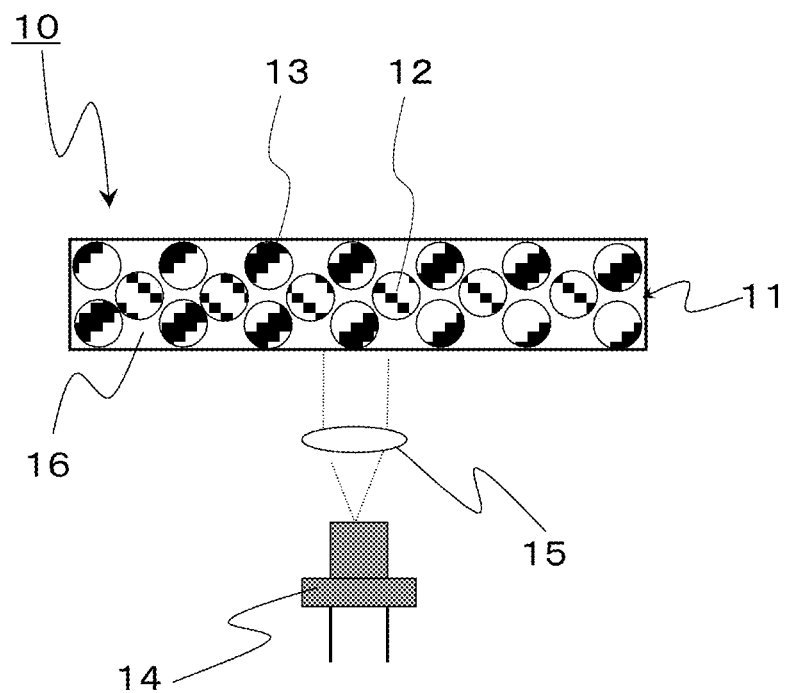
FIG. 1 shows a cross-sectional schematic view of the light-emitting device according to the second embodiment

The present inventors revealed a problem that a luminance of an oxynitride silicate fluorescent substance is decreased with an increase of an energy density of exciting light in a case where the oxynitride silicate fluorescent substance is excited with the exciting light having a high energy density.

The present inventors found the technique in which the luminance of the oxynitride silicate fluorescent substance is improved even when exciting light has a high energy density. The present invention improves the conversion efficiency ratio of the oxynitride silicate fluorescent substance to provide an excellent luminance even when the oxynitride silicate fluorescent substance is excited by light having a high energy density.

First Embodiment

A yellow fluorescent substance according to the first embodiment is represented by a chemical formula $(Ba_{1-x-y-z},Sr_x)_aSi_bO_cN_d:Eu^{2+}{}_y,Y^{3+}{}_z$. All of the following seven mathematical formulae (I)-(VII) are satisfied:

$$0.9 \leq a \leq 1.1 \quad \text{(I)}$$

$$1.9 \leq b \leq 2.1 \quad \text{(III)}$$

$$1.9 \leq c \leq 2.1 \quad \text{(III)}$$

$$1.9 \leq d \leq 2.1 \quad \text{(IV)}$$

$$0 \leq x \leq 1 \quad \text{(V)}$$

$$0 < y < 0.01 \quad \text{(VI)}$$

$$0 \leq z < 0.01 \quad \text{(VII)}.$$

The yellow fluorescent substance according to the first embodiment outputs light having a high luminance even when excited by light having a high energy density.

In particular, the yellow fluorescent substance according to the first embodiment converts light having a wavelength of not less than 380 nanometers and not more than 480 nanometers into light having a wavelength of not less than 570 nanometers and not more than 595 nanometers (i.e., yellow light).

From a viewpoint of stoichiometry, all of the following four equations a=1, b=2, c=2, and d=2 are satisfied in the oxynitride silicate fluorescent substance. However, even if any of the values of a-d fail to be equal to the stoichiometrically accurate values, the oxynitride silicate fluorescent substance converts light emitted from a light-emitting element into yellow light. For this reason, the value of a falls within the range of not less than 0.9 and not more than 1.1. Each value of b, c, and d falls within the range of not less than 1.9 and not more than 2.1.

In case where the value of y (i.e., Eu substitution ratio) is not less than 0.01, the conversion efficiency ratio is decreased. See the sample No. 7-No. 9 and No. 15-No. 17, which will be described later.

The values of x, y, and z may be not less than 0.3 and less than 0.7, not less than 0.0001 and less than 0.01, and not less than 0 and less than 0.01, respectively. Such a yellow fluorescent substance is used to obtain yellow light of high practical use.

The value of y may be not less than 0.0005. In a case where the value of y is not less than 0.001 and less than 0.01, such a yellow fluorescent substance outputs light having a high light-emitting intensity when excited by light having a high energy density (for example, 1.5 kW/cm$^2$).

The value of z may be more than 0 and less than 0.01. Such a yellow fluorescent substance contains yttrium represented by the chemical formula Y as an activating agent. Such a yellow fluorescent substance outputs light having a high light-emitting intensity when excited by light having a high energy density (for example, 1.5 kW/cm$^2$). In a case where the value of z is not less than 0.001 and less than 0.01, such a yellow fluorescent substance outputs light having a significantly high light-emitting intensity when excited by light having a high energy density (for example, 1.5 kW/cm$^2$).

The value of y may be equal to the value of z. Such a yellow fluorescent substance has a high relative luminance ratio. See the sample No. 28, which will be described later.

Next, a method for fabricating the yellow fluorescent substance according to the first embodiment will be described.

As the raw materials of the fluorescent substance in this embodiment, a compound that turns into an oxide by sintering, such as a hydroxide, an oxalate or a nitrate of high purity (purity of not less than 99%), or an oxide of high purity (purity of not less than 99%) can be used.

A barium salt, a strontium salt silicon oxide represented by the chemical formula $SiO_2$, silicon nitride represented by the chemical formula $Si_3N_4$, a europium salt, and an yttrium salt are mixed to prepare a mixture. Then, the mixture is subjected to sintering to give the yellow fluorescent substance according to the first embodiment.

Examples of the used salts are listed in the following items (i)-(iii).

(i) hydroxide, oxalate, carbonate, or nitrate
(ii) oxide
(iii) nitride

The salts listed in the item (i) are changed to an oxide by being subjected to sintering. For example, barium carbonate represented by the chemical formula $BaCO_3$ may be used as a barium salt. Europium oxide represented by the chemical formula $Eu_2O_3$ may be used as a europium salt. Desirably, the salts each have a high purity of not less than 99%.

The mixture may contain a small amount of fluoride such as barium fluoride and/or a small amount of chloride such as strontium chloride to promote the sintering reaction.

These salts may be mixed by a wet blending method which uses a solvent or a dry blending method of blending dry powders. These salts may be mixed sufficiently using a ball mill, a medium stirring mill, a planetary mill, a vibrational mill, a jet mill, a V-shape rotating mixer, or a stirrer, which are usually used industrially.

Then, the mixture is subjected to sintering under a reducing atmosphere in a temperature range of 1.300 degrees Celsius-1.600 degrees Celsius for one-eighty hours. An example of the reducing atmosphere is a nitrogen-hydrogen mixed gas atmosphere. The sintered mixture is washed to remove the unreacted impurities. An example of a solvent used for washing is water or an acid. The sintered mixture is classified if necessary to adjust the particle size distribution and/or the fluidity of the yellow fluorescent substance powder.

When the yellow fluorescent substance according to the first embodiment is excited by light having a high energy density, it outputs light having a high luminance. For this reason, the yellow fluorescent substance according to the first embodiment is used for a light-emitting device to improve the luminance of the light-emitting device. In this way, a high luminance light-emitting device comprising a light-emitting element such as a laser diode is provided.

Second Embodiment

The light-emitting device according to the second embodiment comprises the yellow fluorescent substance according to the first embodiment and a light-emitting element. FIG. 1 shows a cross-sectional schematic view of a light-emitting device 10 according to the second embodiment. The light-emitting device 10 comprises a wavelength conversion member 11 and a semiconductor light-emitting element 14. An example of the semiconductor light-emitting element 14 is a laser diode. The light-emitting device 10 has an excellent luminance even if a laser diode emitting light having a high energy density is used. For this reason, the light-emitting device 10 is downsized. The semiconductor light-emitting element 14 emits light having a peak wavelength of not less than 380 nanometers and not more than 480 nanometers. Desirably, the semiconductor light-emitting element 14 emits blue-violet light. The term "blue-violet light" used in the present specification means light having a peak wavelength of not less than 380 nanometers and not more than 420 nanometers. The semiconductor light-emitting element 14 comprises a nitride semiconductor light-emitting layer having a growth plane of a non-polar or semi-polar plane. The semiconductor light-emitting element 14 may emit light having an energy density of, for example, not less than 0.1 kW/cm$^2$, desirably not less than 0.2 kW/cm$^2$, more desirably not less than 0.5 kW/cm$^2$. The semiconductor light-emitting element 14 may emit light having an energy density of not more than 15 kW/cm$^2$. Excess heat provided by the semiconductor light-emitting element 14 may decrease the conversion efficiency of the yellow fluorescent substance; however, the semiconductor light-emitting element 14 for emitting light having an energy density of not more than 15 kW/cm$^2$ can maintain the conversion efficiency of the yellow fluorescent substance.

The present inventors suppose below in the second embodiment that the semiconductor light-emitting element 14 emits light having a wavelength of 405 nanometers. The wavelength conversion member 11 converts light emitted from the semiconductor light-emitting element 14 into light having a longer wavelength. The wavelength conversion member 11 may contain only the fluorescent substance according to the first embodiment. Instead, the wavelength conversion member 11 may contain a mixture of at least two of fluorescent substances. The wavelength conversion member 11 may be a stacked structure composed of a plurality of layers each containing one fluorescent substance. The present inventors suppose below in the second embodiment that the wavelength conversion member 11 contains a mixture of two fluorescent substances.

The wavelength conversion member 11 contains a plurality of first particles 12 each formed of the yellow fluorescent substance according to the first embodiment, a plurality of second particles 13 each formed of another fluorescent substance, and a binder 16. The binder 16 is used to bind the plurality of the first particles 12 to the plurality of the second particles 13.

The second particle 13 may be formed of a blue fluorescent substance. The blue fluorescent substance means a fluorescent substance capable of converting light having a wavelength of not less than 230 nanometers and not more than 420 nanometers into light having a wavelength of more than 420 nanometers and not more than 480 nanometers. An example of the second fluorescent substance 13 is $Sr_3MgSi_2O_8:Eu^{2+}$ (hereinafter, referred to as "SMS"), $BaMgAl_{10}O_{17}:Eu^{2+}$ (hereinafter, referred to as "BAM"), or $M^2{}_{10}(PO_4)_6Cl_2:Eu^{2+}$ ($M^2$ represents at least one selected from the group consisting of Ba, Sr, and Ca, hereinafter, referred to as "SPA").

The blue fluorescent substance may be fabricated in accordance to a well-known method.

An example of the binder 16 is a resin, glass, or a transparent crystal. An incident optical system 15 may be provided between the wavelength conversion member 11 and the semiconductor light-emitting element 14. The incident optical system 15 leads the light emitted from the semiconductor light-emitting element 14 to the wavelength conversion member 11. For example, the incident optical system 15 comprises a lens, a mirror and/or an optical fiber.

Next, the operation of the light-emitting device 10 will be described. The light emitted from the semiconductor light-emitting element 14 travels through the incident optical system 15 to reach the wavelength conversion member 11. This incident light excites the plurality of the first particles 12 formed of the yellow fluorescent substance according to the first embodiment to emit yellow light. The plurality of the second particles 13 are excited to emit blue light. The yellow light is mixed with the blue light to emit white light.

When the semiconductor light-emitting element 14 is a blue laser diode or a blue light-emitting diode, a part of light emitted from the blue laser diode or the blue light-emitting diode is converted into yellow light by the yellow fluorescent substance according to the first embodiment. In this way, yellow light is obtained. A different part of the blue light emitted from the blue laser diode or the blue light-emitting diode is mixed with yellow light which has been obtained through the yellow fluorescent substance to give white light. As just described, the different part of the blue light emitted from the blue laser diode or the blue light-emitting diode is emitted in the form of being included in the white light to the outside of the light-emitting device 10 without travelling through the fluorescent substance.

On the other hand, when the semiconductor light-emitting element 14 is a blue-violet laser diode or a blue-violet light-emitting diode, the yellow fluorescent substance according to the first embodiment is used in combination with the blue fluorescent substance. A part of light emitted from the blue-violet laser diode or the blue-violet light-emitting diode is converted into blue light by the blue fluorescent substance. In this way, blue light is obtained. A different part of the light emitted from the blue-violet laser diode or the blue-violet light-emitting diode is converted into yellow light by the yellow fluorescent substance according to the first embodiment. In this way, yellow light is obtained. The yellow light and the blue light which have thus been obtained are mixed with each other to give white light. Unlike in a case of using the blue laser diode or the blue light-emitting diode, when the semiconductor light-emitting element 14 is a blue-violet laser diode or a blue-violet light-emitting diode, light emitted from the blue-violet laser diode or the blue-violet light-emitting diode is converted surely into light having a longer wavelength by the fluorescent substances including the yellow fluorescent substance according to the first embodiment and the blue fluorescent substance. In other words, there is no light which is emitted to the outside of the light-emitting device 10 without travelling through the fluorescent substances including the yellow fluorescent substance according to the first embodiment and the blue fluorescent substance. For this reason, when the semiconductor light-emitting element 14 is a blue-violet laser diode or a blue-violet light-emitting diode, white light safe for eyes is obtained.

The blue laser diode and the blue light-emitting diode each emit light having a peak wavelength of more than 420 nanometers and not more than 480 nanometers. On the other hand, the blue-violet laser diode and the blue-violet light-emitting diode each emit light having a peak wavelength of not less than 380 nanometers and not more than 420 nanometers.

Another example of the semiconductor light-emitting element 14 is a light-emitting diode or a superlumincescent diode.

The light-emitting device 10 according to the second embodiment may be used for a light source of, for example, a typical illumination device such as a ceiling light; a special illumination device such as a spotlight, an illumination for stadiums, or an illumination for studios; a vehicle illumination device such as a headlamp; a projection device such as a projector or a head-up display; a light for endoscopes; an imaging device such as a digital camera, a cellular telephone, or a smartphone; or a liquid crystal display device such as a monitor for personal computers, a notebook personal computer, a television, a personal digital assistant (PDA), a smartphone, a tablet personal computer, or a cellular telephone.

Third Embodiment

The illumination device according to the third embodiment comprises the light-emitting device 10 according to the second embodiment. An example of the illumination device is a typical illumination device such as a ceiling light; a special illumination device such as a spotlight, an illumination for stadiums, or an illumination for studios; or a vehicle illumination device such as a headlamp. It is beneficial to use the illumination device as an illumination device of which high illumination intensity is required (for example, a special illumination device or a vehicle illumination device). The term "vehicle" used in the present specification means an automobile, a rail car, a streetcar, a two-wheeled vehicle (e.g., a motorcycle), or a special vehicle (e.g., a construction vehicle or an agriculture vehicle).

As one example, a case will be described where the illumination device according to the third embodiment is used as a vehicle illumination device (e.g., a headlamp).

Figure 2:
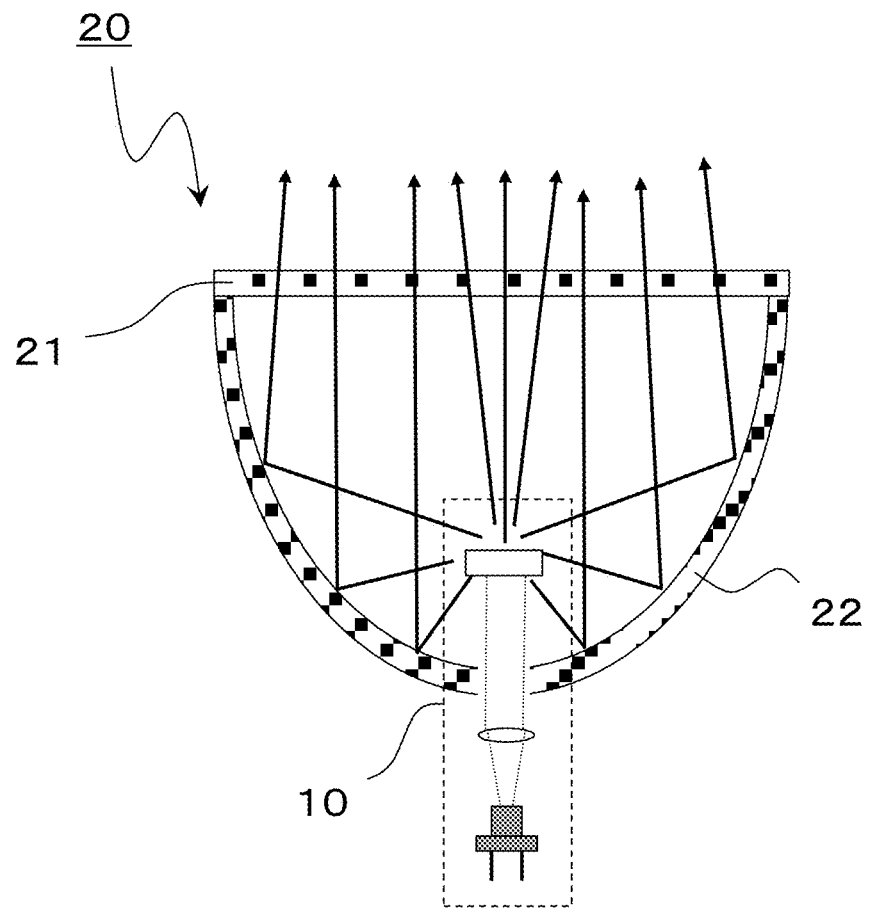
FIG. 2 shows a cross-sectional schematic view of the illumination device according to the third embodiment.
Figure 3:
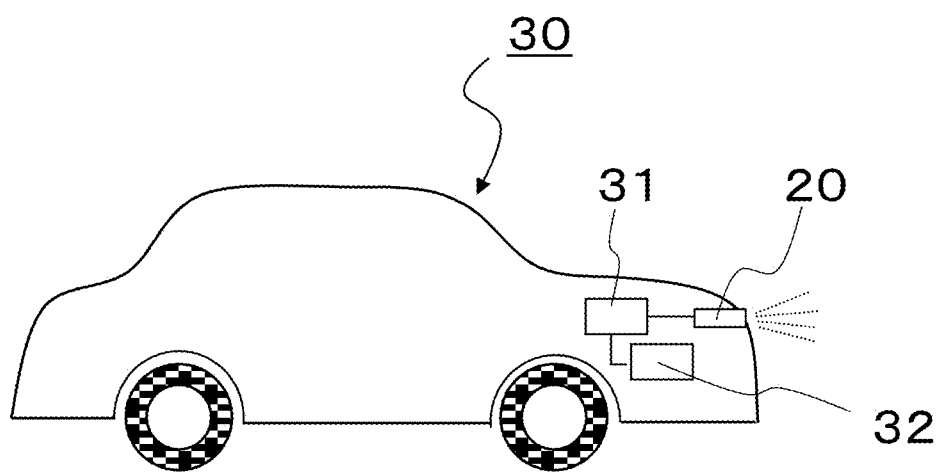
FIG. 3 shows a cross-sectional schematic view of the vehicle according to the fourth embodiment.

FIG. 2 shows a schematic view of a vehicle headlamp 20 according to the third embodiment. The vehicle headlamp 20 according to the third embodiment comprises the light-emitting device 10 according to the second embodiment and a light-emitting optical system 22 for leading ahead the light emitted from the light-emitting device 10. In order to prevent the blue-violet light emitted from the semiconductor light-emitting element included in the light-emitting device 10 from being emitted to the outside of the headlamp 20, a wavelength cut filter 21 for absorbing or reflecting the blue-violet light may be provided. An example of the light-emitting optical system 22 is a reflector. The light-emitting optical system 22 has a metal film formed of Al or Ag on the inside surface thereof. A protective film may be formed on the metal film. The vehicle headlamp 20 may be a reflector-type vehicle headlamp or a projector-type vehicle headlamp.

The third embodiment provides a downsized illumination device.

Fourth Embodiment

The vehicle according to the fourth embodiment comprises the illumination device according to the third embodiment as a vehicle illumination device. The vehicle may be an engine vehicle, an electric vehicle, or a hybrid vehicle.

Figure 4:
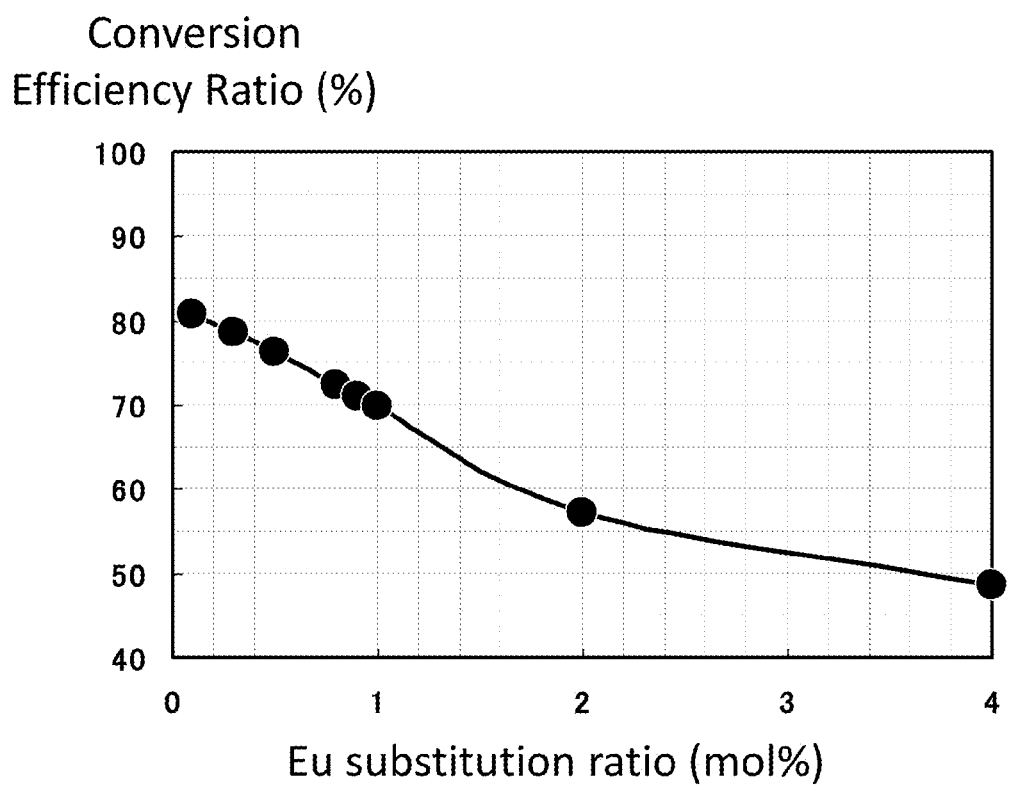
FIG. 4 is a graph indicating the conversion efficiency ratios of the yellow fluorescent substances measured in the experiment example 1.

FIG. 4 shows a schematic view of a vehicle 30 according to the fourth embodiment. The vehicle 30 comprises the vehicle headlamp 20 according to the third embodiment and an electric power supply source 31. The vehicle 30 may have an electric power generator 32 which generates an electric power by being driven by a driving source such as an engine. The electric power generated by the electric power generator 32 is stored in the electric power supply source 31. An example of the electric power supply source 31 is a rechargeable battery. The vehicle headlamp 20 is maintained on by the electric power supplied from the electric power supply source 31.

The fourth embodiment provides a vehicle comprising a downsized illumination device.

EXAMPLES

The present invention will be described in more detail with reference to the following experiment examples.

Experiment Example 1

Fabrication of Fluorescent Substance Sample $BaCO_3$, $SrCO_3$, $SiO_2$, $Si_3N_4$, $Eu_2O_3$ and $Y_2O_3$ were used as starting materials. These starting materials were mixed so as to have compositions shown in Table 1. Then, each mixture was pulverized using a planetary ball mill at a rotation speed of 100 rpm for one hour. Ethanol was used as the solvent for the pulverization. Subsequently, the mixture was dried sufficiently to give a dry powder. The obtained dry powder was subjected to sintering in an $N_2$ gas under a temperature of 1,500 degrees Celsius for four hours to give fluorescent substances represented by a chemical formula $(Ba_{1-x-y-z}Sr_x)Si_2O_2N_2:Eu^{2+}_y,Y^{3+}_z$. The fluorescent substances were washed in a 2% nitric acid solution for one hour. Then, the fluorescent substances were classified to remove coarse particles.

<Light-Emitting Property Evaluation of Fluorescent Substance>

A laser diode for emitting light having a peak wavelength of 405 nanometers was used as an excitation light source to irradiate the obtained fluorescent substances with the laser light. Light of which wavelength had been converted by the fluorescent substance was let in an integrating sphere to measure the light-emitting efficiency and the light-emitting energy using a multi-channel spectroscope (product of Labsphere Inc., available from Ocean Optics, Inc., trade name: USB2000). By varying the surface area of each fluorescent substance irradated with the light emitted from the laser diode, an energy density of the exciting light was changed.

The conversion efficiency ratios of the fluorescent substance excited by the light having a wavelength of 405 nanometers to the exciting light having a high energy density were calculated from the measurement results of the light-emitting efficiency and the light-emitting energy.

More specifically, the conversion efficiency ratio was calculated on the basis of the following mathematical formula (X).

The conversion efficiency ratio=(Conversion Efficiency $CE_{1.5}$ calculated when the exciting light had an energy density of 1.5 $kW/cm^2$)/(Conversion Efficiency $CE_{0.1}$ calculated when the exciting light had an energy density of 0.1 $kW/cm^2$)  (X)

The conversion efficiency $CE_{1.5}$ calculated when the exciting light had an energy density of 1.5 $kW/cm^2$ was calculated on the basis of the following mathematical formula (Xa).

$CE_{1.5}$=(Light-emitting Efficiency $LEE_{1.5}$ measured when the exciting light had an energy density of 1.5 $kW/cm^2$)/(Light-emitting Efficiency $LEE_{0.025}$ measured when the exciting light had an energy density of 0.025 $kW/cm^2$)  (Xa)

The conversion efficiency $CE_{0.1}$ calculated when the exciting light had an energy density of 0.1 $kW/cm^2$ was calculated on the basis of the following mathematical formula (Xb).

$CE_{0.1}$=(Light-emitting Efficiency $LEE_{0.1}$ measured when the exciting light had an energy density of 0.1 $kW/cm^2$)/(Light-emitting Efficiency $LEE_{0.025}$ measured when the exciting light had an energy density of 0.025 $kW/cm^2$)  (Xb)

Figure 5:
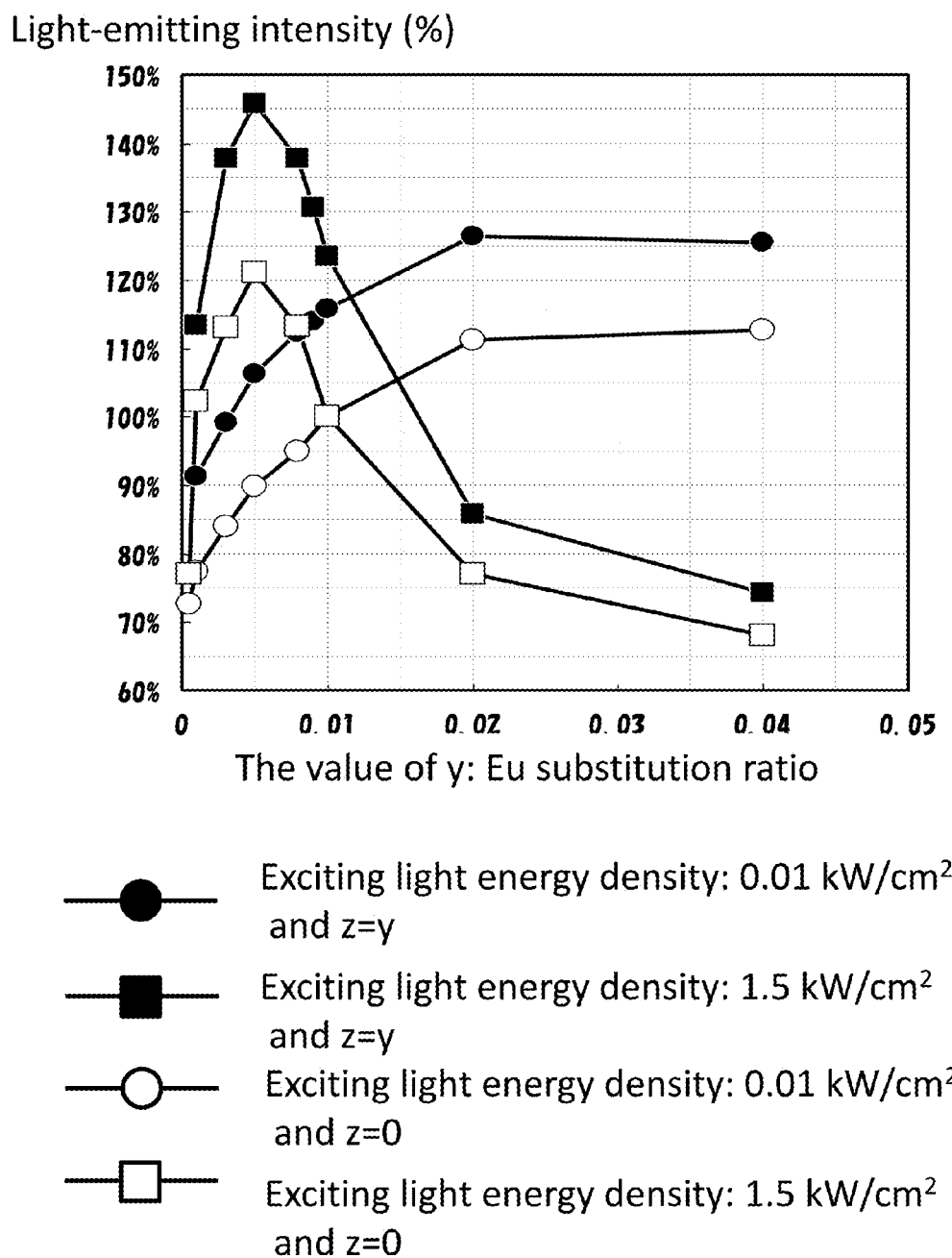
FIG. 5 is a graph indicating the light-emitting intensities of the yellow fluorescent substances measured in the experiment example 1.

Table 1 shows the composition of each fluorescent substance used in the experiment example 1. Table 2 and FIG. 4 show the conversion efficiency ratio of each fluorescent substance used in the experiment example 1. In the tables, each sample which is not marked with "*" is a sample according to an inventive example, whereas each sample which is marked with "*" is a sample according to a comparative example. Table 3 and FIG. 5 show normalized light-emitting intensities NLEI measured when the energy density of the exciting light was 0.01 $kW/cm^2$ or 1.5 $kW/cm^2$.

The normalized light-emitting intensity NLEI was calculated on the basis of the following mathematical formula (XI).

NLEI=Light-emitting intensity of each sample/Light-emitting intensity of the sample No. 7  (XI)

Note that the normalized light-emitting intensity NLEI of the sample No. 7 is 100% in Table 3.

TABLE 1

| Sample Number | Ba | Sr | Si | O | N | Eu | Y |
|---|---|---|---|---|---|---|---|
| 1 | 0.620 | 0.380 | 2 | 2 | 2 | 0.0005 | 0 |
| 2 | 0.619 | 0.380 | 2 | 2 | 2 | 0.001 | 0 |
| 3 | 0.619 | 0.379 | 2 | 2 | 2 | 0.002 | 0 |
| 4 | 0.618 | 0.379 | 2 | 2 | 2 | 0.003 | 0 |
| 5 | 0.617 | 0.378 | 2 | 2 | 2 | 0.005 | 0 |
| 6 | 0.615 | 0.377 | 2 | 2 | 2 | 0.008 | 0 |
| *7 | 0.614 | 0.376 | 2 | 2 | 2 | 0.010 | 0 |
| *8 | 0.608 | 0.372 | 2 | 2 | 2 | 0.020 | 0 |
| *9 | 0.595 | 0.365 | 2 | 2 | 2 | 0.040 | 0 |
| 10 | 0.619 | 0.379 | 2 | 2 | 2 | 0.001 | 0.001 |
| 11 | 0.616 | 0.378 | 2 | 2 | 2 | 0.003 | 0.003 |
| 12 | 0.614 | 0.376 | 2 | 2 | 2 | 0.005 | 0.005 |
| 13 | 0.610 | 0.374 | 2 | 2 | 2 | 0.008 | 0.008 |
| 14 | 0.609 | 0.373 | 2 | 2 | 2 | 0.009 | 0.009 |
| *15 | 0.608 | 0.372 | 2 | 2 | 2 | 0.010 | 0.010 |
| *16 | 0.595 | 0.365 | 2 | 2 | 2 | 0.020 | 0.020 |
| *17 | 0.570 | 0.350 | 2 | 2 | 2 | 0.040 | 0.040 |

TABLE 2

| Sample Number | Eu | Y | Conversion efficiency ratio (%) 0.1 kW/cm² | Conversion efficiency ratio (%) 1.5 kW/cm² |
|---|---|---|---|---|
| 1 | 0.0005 | 0 | 99.4% | 92.0% |
| 2 | 0.001 | 0 | 99.0% | 87.4% |
| 3 | 0.002 | 0 | 98.8% | 80.9% |
| 4 | 0.003 | 0 | 98.7% | 77.3% |
| 5 | 0.005 | 0 | 98.5% | 76.1% |
| 6 | 0.008 | 0 | 98.3% | 71.4% |
| *7 | 0.010 | 0 | 98.3% | 67.8% |
| *8 | 0.020 | 0 | 97.9% | 61.6% |
| *9 | 0.040 | 0 | 97.5% | 53.4% |
| 10 | 0.001 | 0.001 | 97.3% | 80.8% |
| 11 | 0.003 | 0.003 | 97.1% | 78.5% |
| 12 | 0.005 | 0.005 | 97.0% | 76.3% |
| 13 | 0.008 | 0.008 | 96.9% | 72.3% |
| 14 | 0.009 | 0.009 | 95.9% | 71.0% |
| *15 | 0.010 | 0.010 | 94.8% | 69.8% |
| *16 | 0.020 | 0.020 | 92.7% | 57.1% |
| *17 | 0.040 | 0.040 | 90.6% | 48.6% |

TABLE 3

| Sample Number | Eu | Y | Normalized light-emitting intensity (%) 0.01 kW/cm² | Normalized light-emitting intensity (%) 1.5 kW/cm² |
|---|---|---|---|---|
| 1 | 0.0005 | 0 | 72.6% | 77.0% |
| 2 | 0.001 | 0 | 77.4% | 102.2% |
| 3 | 0.002 | 0 | 81.4% | 109.8% |
| 4 | 0.003 | 0 | 84.0% | 113.0% |
| 5 | 0.005 | 0 | 89.9% | 121.1% |
| 6 | 0.008 | 0 | 95.0% | 113.3% |
| *7 | 0.010 | 0 | 100.0% | 100.0% |
| *8 | 0.020 | 0 | 111.2% | 77.1% |
| *9 | 0.040 | 0 | 112.6% | 68.0% |
| 10 | 0.001 | 0.001 | 91.3% | 113.4% |
| 11 | 0.003 | 0.003 | 99.2% | 137.7% |
| 12 | 0.005 | 0.005 | 106.2% | 145.7% |
| 13 | 0.008 | 0.008 | 112.4% | 137.7% |
| 14 | 0.009 | 0.009 | 114.1% | 130.6% |
| *15 | 0.010 | 0.010 | 115.7% | 123.5% |
| *16 | 0.020 | 0.020 | 126.4% | 85.8% |
| *17 | 0.040 | 0.040 | 125.6% | 74.3% |

As is clear from Table 2 and FIG. 4, when the exciting light has an energy density of 1.5 kW/cm², the value of y (i.e., Eu substitution ratio) is required to be more than 0 and less than 0.01 to give a conversion efficiency ratio more than 70%. As is clear from the conversion efficiency ratio with regard to the exciting light having an energy density of 0.1 kW/cm², the conversion efficiency ratio is increased with a decrease in the value of y.

As is clear from Table 3 and FIG. 5, when the exciting light has an energy density of 0.01 kW/cm², the light-emitting intensity is raised with an increase in the value of y (i.e., Eu substitution ratio). On the other hand, when the exciting light has an energy density of 1.5 kW/cm², the light-emitting intensity has a peak within the range where y is less than 0.01. The light-emitting intensity is significantly high within the range where y is not less than 0.001 and less than 0.01. When Eu atoms are partially substituted with Y atoms, the light-emitting intensity is raised more.

Experiment Example 2

An experiment similar to the experiment example 1 was performed, except that the compositions shown in Table 4 were used instead of the compositions shown in Table 1.

The CIE chromaticity coordinate values of the obtained fluorescent substances were measured using the same device as the device used in the experiment example 1. The exciting light had an energy density of 1.5 kW/cm².

TABLE 4

| Sample Number | Ba | Sr | Si | O | N | Eu | Y | CIE x | CIE y |
|---|---|---|---|---|---|---|---|---|---|
| 18 | 0.10 | 0.89 | 2 | 2 | 2 | 0.005 | 0.005 | 0.356 | 0.528 |
| 19 | 0.30 | 0.69 | 2 | 2 | 2 | 0.005 | 0.005 | 0.380 | 0.584 |
| 20 | 0.40 | 0.59 | 2 | 2 | 2 | 0.005 | 0.005 | 0.408 | 0.560 |
| 21 | 0.50 | 0.49 | 2 | 2 | 2 | 0.005 | 0.005 | 0.433 | 0.542 |
| 22 | 0.60 | 0.39 | 2 | 2 | 2 | 0.005 | 0.005 | 0.444 | 0.532 |
| 23 | 0.69 | 0.30 | 2 | 2 | 2 | 0.005 | 0.005 | 0.435 | 0.529 |
| 24 | 0.70 | 0.29 | 2 | 2 | 2 | 0.005 | 0.005 | 0.163 | 0.156 |
| 25 | 0.80 | 0.19 | 2 | 2 | 2 | 0.005 | 0.005 | 0.135 | 0.125 |

A practical yellow fluorescent substance has CIE chromaticity coordinate values of $0.38 \leq CIEx \leq 0.50$ and $0.50 \leq CIEy \leq 0.60$. As is clear from Table 4, when the value of x (i.e., Sr substitution ratio) falls within the range of not less than 0.3 and less than 0.7, the CIE chromaticity coordinate values of $0.38 \leq CIEx \leq 0.50$ and $0.50 \leq CIEy \leq 0.60$ are satisfied. In the examples of Sample No. 24 and No. 25 which have the value of x (i.e., Sr substitution ratio) of not less than 0.7, the present inventors believe that the above-mentioned CIE chromaticity coordinate values failed to be satisfied since a $BaSi_2O_2N_2$ crystal phase was mixed in a $(Ba,Sr)Si_2O_2N_2$ crystal phase. As long as the $(Ba,Sr)Si_2O_2N_2$ crystal phase is fabricated without precipitating the $BaSi_2O_2N_2$ crystal phase, the value of x (i.e., Sr substitution ratio) may be not less than 0.7. Besides, in light of the light-emitting intensity, when y is not less than 0.0001 and less than 0.01, the yellow fluorescent substance is of high practical use.

Experiment Example 3

An experiment similar to the experiment example 1 was performed, except that the compositions shown in Table 5 were used instead of the compositions shown in Table 1.

The light-emitting spectra of the obtained fluorescent substances were measured using the same device as the device used in the experiment example 1. The exciting light had an energy density of 1.5 kW/cm² and a wavelength of 405 nanometers. The relative luminance ratios were calculated on the basis of the following mathematical formula (XI).

(Relative luminance ratio)=(Luminance measured when a part of the Ba atoms were substituted with Y atoms)/(Luminance measured when a part of the Ba atoms were not substituted with Y atoms)   (XI)

TABLE 5

| Sample Number | Ba | Sr | Si | O | N | Eu | Y | Relative luminance ratio |
|---|---|---|---|---|---|---|---|---|
| 26 | 0.617 | 0.378 | 2 | 2 | 2 | 0.005 | 0 | 100% |
| 27 | 0.615 | 0.377 | 2 | 2 | 2 | 0.005 | 0.003 | 108% |
| 28 | 0.614 | 0.376 | 2 | 2 | 2 | 0.005 | 0.005 | 122% |
| 29 | 0.613 | 0.375 | 2 | 2 | 2 | 0.005 | 0.007 | 111% |
| 30 | 0.611 | 0.374 | 2 | 2 | 2 | 0.005 | 0.01 | 108% |

As is clear from Table 5, yttrium represented by the chemical formula Y is added to improve the luminance. When the concentration of yttrium is equal to the concentration of europium, the relative luminance ratio is raised.

INDUSTRIAL APPLICABILITY

The fluorescent substance according to the present invention can be combined with a light-emitting element to be used as a light-emitting device. The light-emitting device according to the present invention can be used for a light source of, for example, a typical illumination device such as a ceiling light; a special illumination device such as a spotlight, an illumination for stadiums, or an illumination for studios; a vehicle illumination device such as a headlamp; a projection device such as a projector or a head-up display; a light for endoscopes; an imaging device such as a digital camera, a cellular telephone, or a smartphone; or a liquid crystal display device such as a monitor for personal computers, a notebook personal computer, a television, a personal digital assistant (PDA), a smartphone, a tablet personal computer, or a cellular telephone.

REFERENTIAL SIGNS LIST

10 light-emitting device
11 wavelength conversion member
12 first particle (yellow fluorescent substance)
13 second particle (blue fluorescent substance)
14 semiconductor light-emitting element
15 incident optical system
16 binder

The invention claimed is:

1. A yellow fluorescent substance represented by a chemical formula $(Ba_{1-x-y-z},Sr_x)_a Si_b O_c N_d:Eu^{2+}_y, Y^{3+}_z$, wherein all of the following seven mathematical formulae (I)-(VII) are satisfied:

$$0.9 \leq a \leq 1.1 \quad \text{(I)}$$

$$1.9 \leq b \leq 2.1 \quad \text{(II)}$$

$$1.9 \leq c \leq 2.1 \quad \text{(III)}$$

$$1.9 \leq d \leq 2.1 \quad \text{(IV)}$$

$$0 \leq x \leq 1 \quad \text{(V)}$$

$$0 < y < 0.01 \quad \text{(VI)}$$

$$0 \leq z < 0.01 \quad \text{(VII)}.$$

2. The yellow fluorescent substance according to claim 1, wherein all of the following three mathematical formulae (Va)-(VIIa) are satisfied:

$$0.3 \leq x < 0.7 \quad \text{(Va)}$$

$$0.0001 \leq y < 0.01 \quad \text{(VIa)}$$

$$0 \leq z < 0.01 \quad \text{(VIIa)}.$$

3. The yellow fluorescent substance according to claim 1, wherein the following mathematical formula (VIb) is further satisfied:

$$0.001 \leq y < 0.01 \quad \text{(VIb)}.$$

4. The yellow fluorescent substance according to claim 1, wherein the following mathematical formula (VIIb) is further satisfied:

$$0 < z < 0.01 \quad \text{(VIIb)}.$$

5. The yellow fluorescent substance according to claim 4, wherein
y=z.

6. A light-emitting device, comprising:
the yellow fluorescent substance according to claim 1; and
a light-emitting element.

7. The light-emitting device according to claim 6, further comprising:
a blue fluorescent substance.

8. The light-emitting device according to claim 6, wherein the light-emitting element comprises a light-emitting layer formed of a nitride semiconductor having a growth surface of a non-polar or semi-polar plane.

9. The light-emitting device according to claim 6, wherein the light-emitting element emits light having a peak wavelength of not less than 380 nanometers and not more than 480 nanometers.

10. The light-emitting device according to claim 6, wherein the light-emitting element is a laser diode.

11. The light-emitting device according to claim 6, wherein the light-emitting element has an energy density of not less than 0.1 kW/cm$^2$.

12. An illumination device comprising the light-emitting device according to claim 6.

13. The illumination device according to claim 12, wherein the illumination device is a vehicle illumination device.

14. A vehicle comprising the vehicle illumination device according to claim 13.

* * * * *